US009767157B2

(12) United States Patent
Panda et al.

(10) Patent No.: US 9,767,157 B2
(45) Date of Patent: Sep. 19, 2017

(54) PREDICTING SITE QUALITY

(71) Applicant: Google Inc., Mountain View, CA (US)

(72) Inventors: Navneet Panda, Mountain View, CA (US); Yun Zhou, Mountain View, CA (US)

(73) Assignee: Google Inc., Mountain View, CA (US)

( * ) Notice: Subject to any disclaimer, the term of this patent is extended or adjusted under 35 U.S.C. 154(b) by 892 days.

(21) Appl. No.: 13/843,150

(22) Filed: Mar. 15, 2013

(65) Prior Publication Data

US 2014/0280011 A1 Sep. 18, 2014

(51) Int. Cl.
G06Q 30/00 (2012.01)
G06F 17/30 (2006.01)

(52) U.S. Cl.
CPC .... G06F 17/3053 (2013.01); G06F 17/30861 (2013.01); G06F 17/30864 (2013.01)

(58) Field of Classification Search
CPC . G06F 17/30864; G06F 17/2785; G06F 17/27
See application file for complete search history.

(56) References Cited

U.S. PATENT DOCUMENTS

| 7,603,350 | B1 * | 10/2009 | Guha |
| 7,797,344 | B2 * | 9/2010 | Kaul et al. ..................... 707/791 |
| 7,836,050 | B2 | 11/2010 | Jing et al. |
| 8,442,984 | B1 * | 5/2013 | Pennock et al. ............... 707/748 |
| 8,515,937 | B1 * | 8/2013 | Sun ......................... G06Q 10/10 707/707 |
| 2004/0139192 | A1 * | 7/2004 | Spaid .................. G06F 17/3089 709/224 |
| 2005/0289103 | A1 * | 12/2005 | Bier .................................. 707/1 |
| 2006/0218106 | A1 * | 9/2006 | Pope ................ G06F 17/30864 706/12 |
| 2006/0224552 | A1 * | 10/2006 | Riezler ............. G06F 17/30702 |
| 2006/0253345 | A1 * | 11/2006 | Heber .................... G06Q 10/00 705/26.1 |
| 2007/0266022 | A1 * | 11/2007 | Frumkin ........... G06F 17/30864 |

(Continued)

OTHER PUBLICATIONS

Lin and Weng, "Computing confidence score of any input phrases for a spoken dialog system," Spoken Language Technology Workshop (SLT), 2010 IEEE, pp. 295-300 Dec. 12-15, 2010.

(Continued)

Primary Examiner — Augustine K Obisesan
(74) Attorney, Agent, or Firm — Fish & Richardson P.C.

(57) ABSTRACT

Methods, systems, and apparatus, including computer programs encoded on computer storage media, for predicating a measure of quality for a site, e.g., a web site. In some implementations, the methods include obtaining baseline site quality scores for multiple previously scored sites; generating a phrase model for multiple sites including the previously scored sites, wherein the phrase model defines a mapping from phrase specific relative frequency measures to phrase specific baseline site quality scores; for a new site that is not one of the previously scored sites, obtaining a relative frequency measure for each of a plurality of phrases in the new site; determining an aggregate site quality score for the new site from the phrase model using the relative frequency measures of phrases in the new site; and determining a predicted site quality score for the new site from the aggregate site quality score.

9 Claims, 3 Drawing Sheets

(56) References Cited

U.S. PATENT DOCUMENTS

| | | | |
|---|---|---|---|
| 2008/0306830 A1* | 12/2008 | Lasa | G06Q 30/02 |
| | | | 705/14.16 |
| 2008/0313167 A1* | 12/2008 | Anderson | G06F 17/30864 |
| 2009/0070312 A1* | 3/2009 | Patterson | G06F 17/30616 |
| 2009/0158251 A1* | 6/2009 | Angrish | G06F 17/30914 |
| | | | 717/115 |
| 2009/0193293 A1* | 7/2009 | Stolfo et al. | 714/26 |
| 2011/0035211 A1* | 2/2011 | Eden | G06F 17/2735 |
| | | | 704/10 |
| 2011/0055189 A1* | 3/2011 | Effrat et al. | 707/706 |
| 2011/0258204 A1* | 10/2011 | Hubbard | G06Q 30/02 |
| | | | 707/749 |
| 2011/0313865 A1 | 12/2011 | Sinyagin et al. | |
| 2011/0314142 A1 | 12/2011 | Newton | |
| 2012/0041768 A1* | 2/2012 | Reese | 705/1.1 |
| 2012/0053927 A1* | 3/2012 | Kulkarni | G06F 17/30884 |
| | | | 704/9 |
| 2013/0138641 A1* | 5/2013 | Korolev | G06F 17/2785 |
| | | | 707/730 |

OTHER PUBLICATIONS

International Search Report and Written Opinion for PCT/US2014/022776 mailed Jun. 3, 2014, 7 pages.
International Preliminary Report on Patentability for PCT/US2014/022776, mailed Sep. 24, 2015, 5 pages.

* cited by examiner

PREDICTING SITE QUALITY

BACKGROUND

This specification relates to ranking search results of search queries submitted to an Internet search engine.

Internet search engines aim to identify resources, e.g., web pages, images, text documents, multimedia content, that are relevant to a user's information needs and to present information about the resources in a manner that is most useful to the user. Internet search engines generally return a set of search results, each identifying a respective resource, in response to a user-submitted query.

SUMMARY

This specification describes how a system can determine a score for a site, e.g., a web site or other collection of data resources, for use in ranking by a search engine, that represents a measure of quality for the site. The site quality score for a site can be used as a signal to rank resources, or to rank search results that identify resources, that are found on one site relative to resources found on another site.

In general, one innovative aspect of the subject matter described in this specification can be embodied in methods that include the actions of obtaining baseline site quality scores for a plurality of previously-scored sites; generating a phrase model for a plurality of sites including the plurality of previously-scored sites, wherein the phrase model defines a mapping from phrase-specific relative frequency measures to phrase-specific baseline site quality scores; for a new site, the new site not being one of the plurality of previously-scored sites, obtaining a relative frequency measure for each of a plurality of phrases in the new site; determining an aggregate site quality score for the new site from the phrase model using the relative frequency measures of the plurality of phrases in the new site; and determining a predicted site quality score for the new site from the aggregate site quality score.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. Each phrase is an n-gram of tokens, the n-gram is a 2-gram, 3-gram, 4-gram or 5-gram. The method also includes determining the phrase relative frequency measures for each site and phrase based on the how many pages on the site contain the phrase divided by how many pages are on the site. Determining an aggregate site quality score for the new site includes: for each of a plurality of phrases found on the new site, determining the relative frequency measure of the phrase, and obtaining an average score for the phrase from the phrase model according to the relative frequency measure; and computing an aggregate score from the average scores across all phrases. The method also includes providing the predicted site quality score as a site quality score input to a ranking engine of a search engine. The subject matter described in this specification can be implemented in particular embodiments so as to realize one or more of the following advantages. Site quality scores representing a measure of quality for sites, e.g., web sites, can be computed fully automatically.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
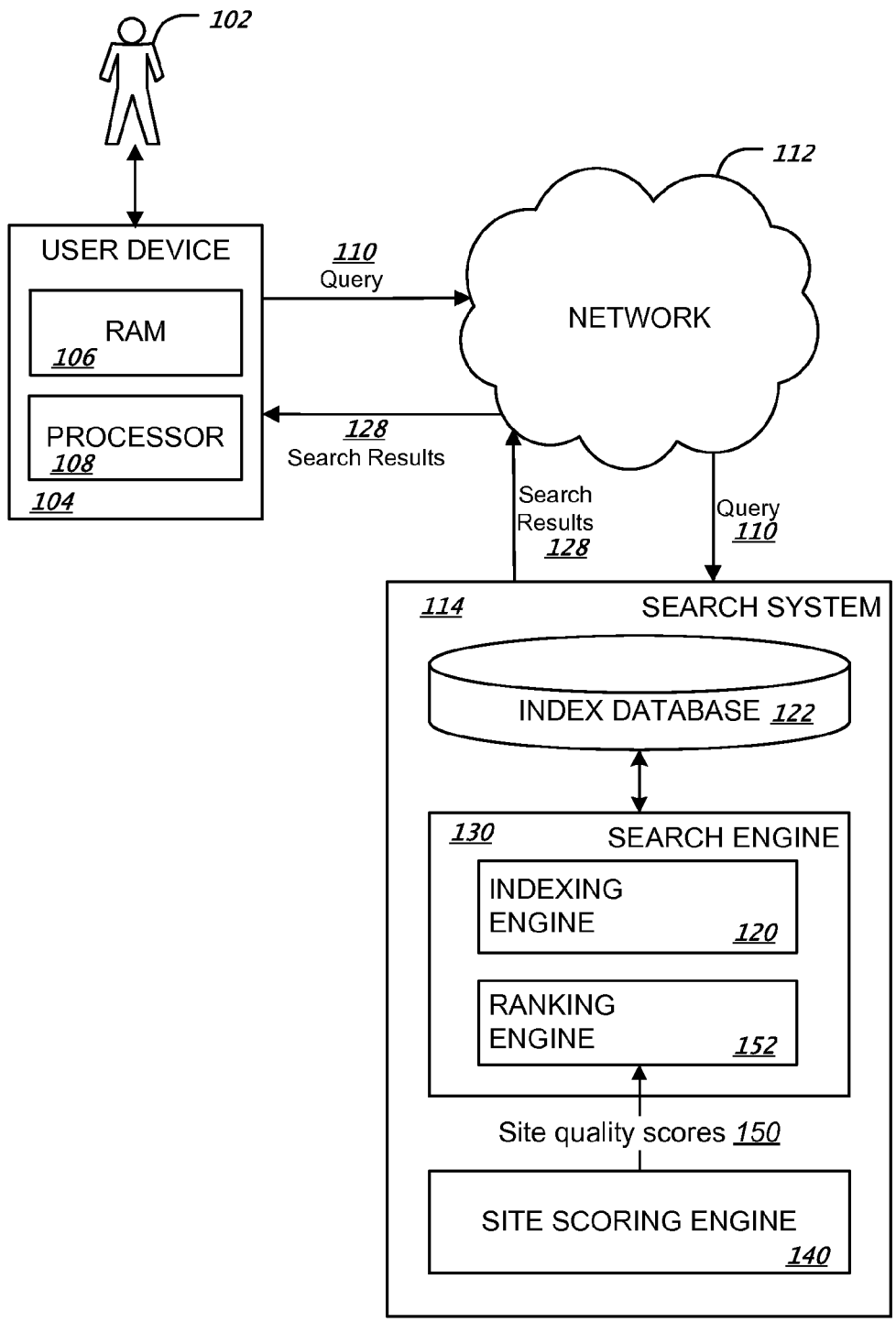
FIG. 1 shows an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. For example, the user device 104 can be a computer coupled to the search system 114 through a data communication network 112, e.g., a local area network (LAN) or wide area network (WAN), e.g., the Internet, or a combination of networks. In some cases, the search system 114 can be implemented on the user device 104, for example, if a user installs an application that performs searches on the user device 104. The user device 104 will generally include a memory, e.g., a random access memory (RAM) 106, for storing instructions and data and a processor 108 for executing stored instructions. The memory can include both read only and writable memory. For example, the user device 104 can be a personal computer of some kind, a cloud client device, a smartphone, or a personal digital assistant. The user device 104 can run an application program, e.g., a web browser, that can interact with the search system 114 to display web pages that provide a user interface to the search system 114 for the user 102 of the user device 104.

A user 102 can use the user device 104 to submit a query 110 to a search system 114. A search engine 130 within the search system 114 performs the search to identify resources satisfying the query. When the user 102 submits a query 110, the query 110 may be transmitted through the network 112 to the search system 114. The search system 114 includes an index database 122 and the search engine 130. The index database 122 can include multiple collections of data, each of which may be organized and accessed differently. The search system 114 responds to the query 110 by generating search results 128, which are transmitted through the network to the user device 104 for presentation to the user 102, e.g., as a search results web page to be displayed by a web browser running on the user device 104.

When the query 110 is received by the search engine 130, the search engine 130 identifies resources that satisfy the query 110. The search engine 130 will generally include an indexing engine 120 that indexes resources on the Internet and uses an index database 122 to store the index information, and a ranking engine 152 or other software that generates scores for the resources that satisfy the query 110 and that ranks the resources according to their respective scores.

The search system 114 can include, and can communicate with, a site scoring engine 140 that uses phrase models to generate site quality scores 150 for sites, as will be described below.

Figure 2:
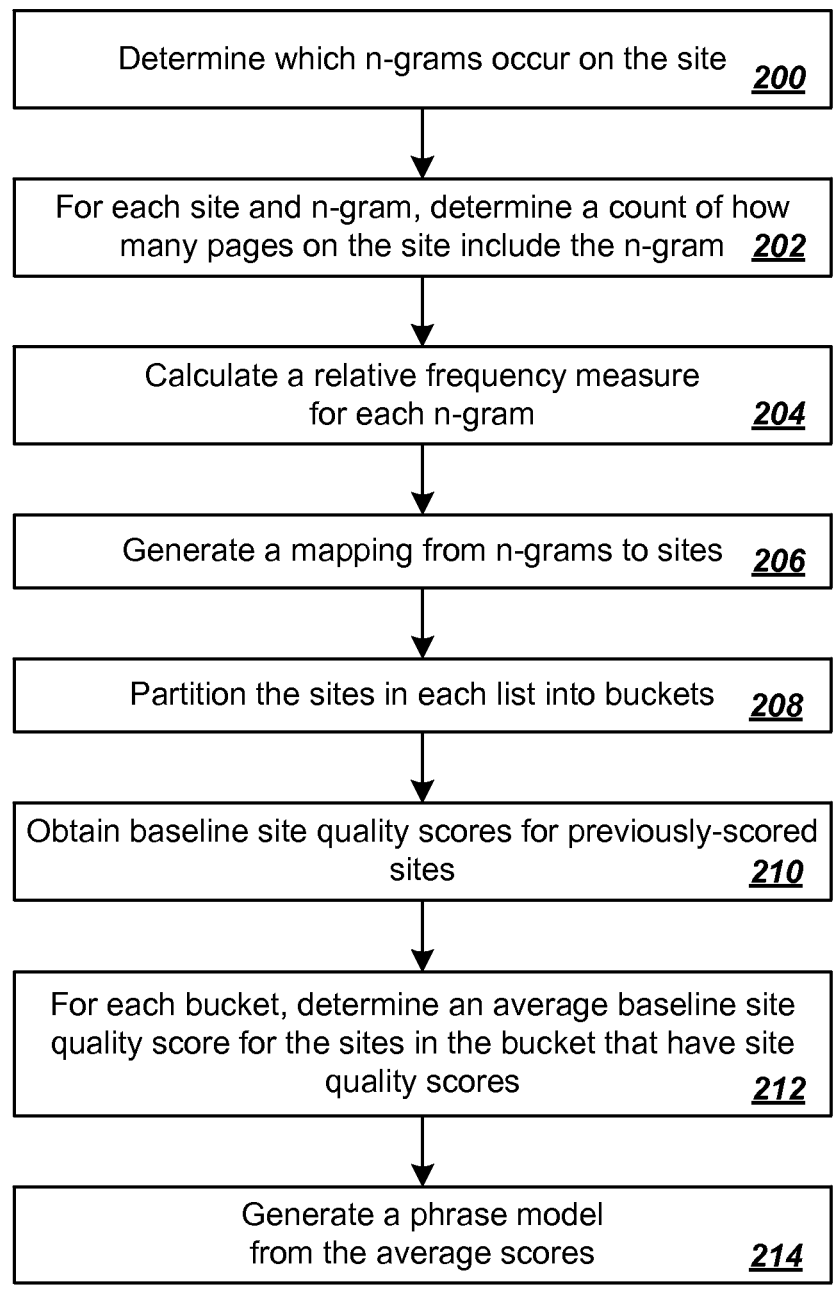
FIG. 2 is a flow diagram of an example process for generating a phrase model.

FIG. 2 is a flow diagram of an example process for generating a phrase model. The model can be used in predicting a measure of site quality. The process can be performed by a system including one or more appropriately programmed computers. For example, a search system 114, of the kind described in reference to FIG. 1, can be used to perform the process.

For each site in a collection of sites, determine which n-grams, of a set of n-grams, occur on the site (200). The collection of sites can be all the sites indexed by a web search system, for example, or a smaller collection. In some implementations, the collection is a collection of previously-scored sites, which will be described below. The n-grams are n-grams of tokens, including punctuation tokens, determined from a tokenization of the pages on the sites. In some implementations, the tokenization is not normalized, i.e., the tokenization preserves any errors existing in the original text.

In some implementations, each n-gram is a 3-gram. In some implementations, each n-gram is a 2-gram. In some implementations, each n-gram is a 2-gram or a 3-gram. In other implementations, longer n-grams are used, e.g., 4-grams or 5-grams. In some implementations, n-grams of different lengths are used. In other implementations, n-grams of only one length are used.

In some implementations, the set of n-grams is all the n-grams the system has seen. In other implementations, infrequent n-grams are excluded. Infrequent n-grams are n-grams that occur on very few sites, e.g., fewer than 10, 50, 75 or 100 sites, when the collection of sites is basically the sites on the web. The frequency threshold for excluding n-grams may be determined based on experience.

For each site, for each n-gram, determine a count of how many pages on the site include the n-gram (202). In some implementations, pages are considered to include text from sources other than the pages themselves, for example, from anchor text of links pointing to the pages. For each site, calculate a relative frequency measure for each n-gram, which is based on the count of pages divided by the number of pages on the site (204). The measure can be the quotient, or a function of the quotient.

Generate a mapping from n-grams to sites (206). Each n-gram is mapped to a list of sites, and each site in each list is associated with the relative frequency measure of the site for the n-gram.

Partition the sites in each list into buckets according to the relative frequency measures of the phrase in the sites (208). The number of buckets can be in the range of 20 to 100, e.g., 20, 40, 60, 70, 80, 90 or 100. In some implementations, the partition is such that the relative frequency intervals represented by the buckets are equal. In other implementations, the relative frequency intervals are selected so that approximately the same number of sites fall into each bucket.

Obtain baseline site quality scores for a number of previously-scored sites (210). The baseline site quality scores are scores used by the system, e.g., by a ranking engine of the system, as signals, among other signals, to rank search results. In some implementations, the baseline scores are determined by a backend process that may be expensive in terms of time or computing resources, or by a process that may not be applicable to all sites. For these or other reasons, baseline site quality scores are not available for all sites.

For each bucket, determine an average baseline site quality score for the sites in the bucket that have baseline site quality scores (212). The average can be an arithmetic or geometric mean, a mode, a median, or another function of the scores that is a measure of a central tendency.

Generate a phrase model from the average scores (214). A phrase model defines a mapping, for each of a number of phrases, from the phrase, e.g., an n-gram as described above, to an average site quality score. In some implementations, for each phrase in a set of phrases, the phrase model associates a vector of average scores with the phrase, one average baseline quality score for each of the buckets described above. In some implementations, each phrase is an n-gram and the set of phrases is the same as set of n-grams described above. Optionally, in generating the phrase model, certain phrases can be excluded, for example, phrases having baseline average scores that are very close to a global average of all baseline scores averaged across all phrases. The global average may be seen as, and referred to as, a "neutral" site quality score. The two averages can be considered "very close" if phrase averages are all within 0.2%, 0.5%, 1%, 2%, 2.5%, 3% or 5%, for example, of the neutral score. An example of a 2-gram phrase that can be excluded is "on the", which empirically is almost equally likely to appear in a high quality site as in a low quality site. The presence of "on the" on a site therefore provides little information on site quality.

The phrase model can be used to predict a site quality score for a new site; in particular, this can be done in the absence of other information, as will be described in reference to FIG. 3. The goal of the process is to predict a score that is comparable to the baseline site quality scores of the previously-scored sites.

Figure 3:
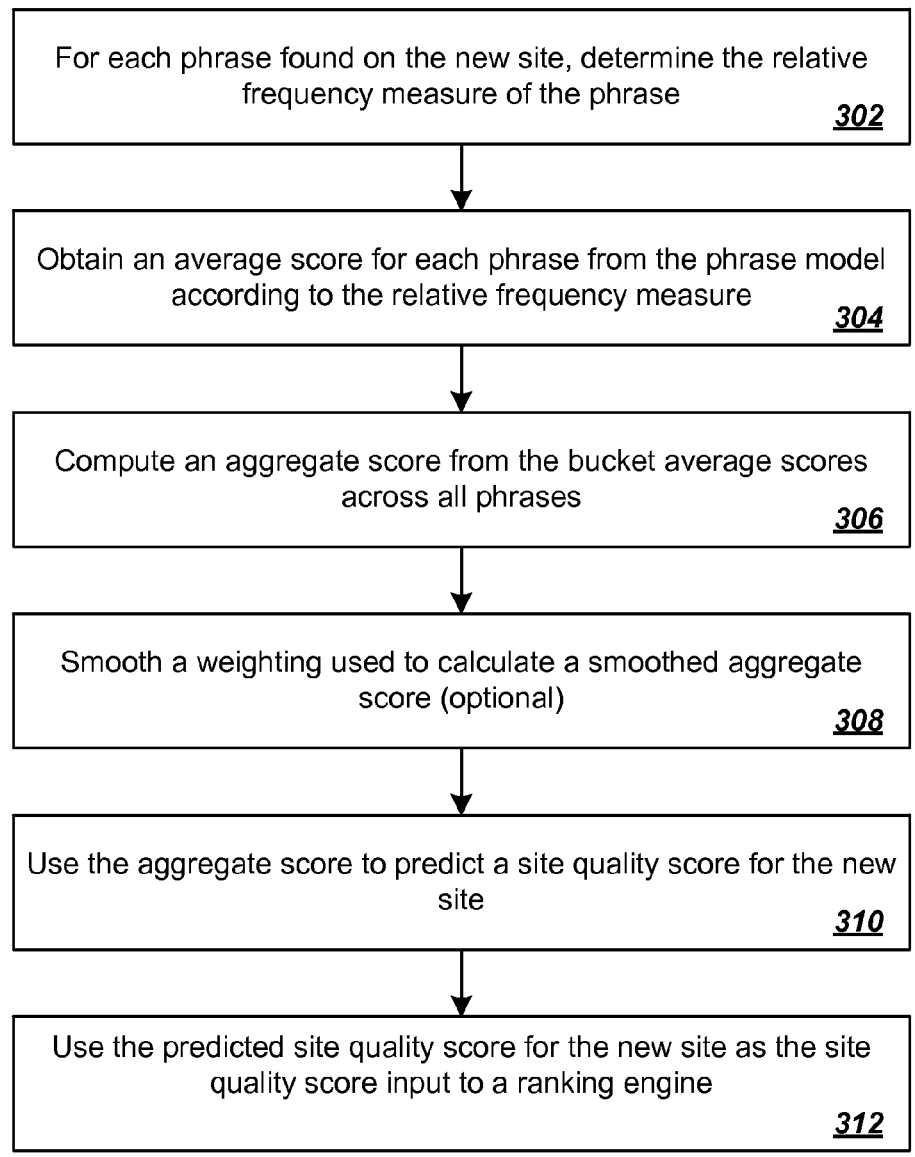
FIG. 3 is a flow diagram of another example process for predicting a measure of site quality from a phrase model.

FIG. 3 is a flow diagram of an example process for predicting a measure of site quality from a phrase model. The process can be performed by a system including one or more appropriately programmed computers. For example, a search system 114, of the kind described in reference to FIG. 1, can be used to perform the process.

For each phrase found on the new site, determine the relative frequency measure of the phrase as described above (302), and obtain an average score from the phrase model according to the relative frequency measure (304). With implementations of the phrase model using buckets as described above, to obtain the average score, look up the relative frequency measure of the phrase in the phrase model to obtain the bucket average score for the bucket corresponding to the relative frequency measure. This yields a bucket average score for each phrase in the new site.

Compute an aggregate score from the average scores across all phrases (306). The aggregate score can be an average, e.g., an arithmetic or geometric mean, a mode, a median, or another function of the scores that is a measure of a central tendency.

In some implementations, the aggregate score is a weighted average. One or more weights can be used. For example, the frequency of the phrases in the new site, or a function of the frequency, can be used as a weight. In addition or alternatively, a distance from a neutral site quality score can be used as a weight.

In addition or alternatively, average scores of phrases that occur in only one domain can be given a reduced weight, representing a judgment that such scores are not fully trustworthy.

In some implementations, each of the phrases has a weight and the distribution of weights is used to determine whether to smooth the weighting. For example, in some implementations, to avoid having a small number of phrases dominate the score calculation, the sum of the weights of the top N phrases is divided by the sum of the weights of all the phrases in the phrase model. N is a small number, e.g., 10, 20, 30, 40 or 50, that can be selected empirically. The resulting quotient represents the percentage contribution of the most frequent phrases. If the quotient is too high, the aggregate score is smoothed (308), for example, by linear interpolation with a neutral score, e.g., the global average site quality score described above.

$$\text{smoothed aggregate score} = \text{aggregate score} \times \text{alpha} + \text{neutral score} \times (1 - \text{alpha})$$

The quotient can be determined to be too high if it is greater than a threshold value, e.g., 0.1, 0.15, 0.20, 0.30, or 0.40. The linear interpolation coefficient alpha can be, for example, 0.90, 0.80, 0.75, 0.60, or it can be a function of the quotient. For example, the value of alpha can be set by an empirically determined function, e.g., a sigmoid function with values ranging from zero to one, so that when the quotient is larger the value of alpha is smaller, resulting in a greater smoothing effect when the effect of the most frequent phrases is greatest. The smoothing (308) can be repeated until an acceptable quotient value is achieved.

The final aggregate score for the new web site can be used to predict the site quality score of the new web site (310). In some implementations, the aggregate score is used directly as a site quality score by the ranking engine 152 (FIG. 1) (312). In other implementations, a function of the aggregate score is used as the site quality score for the new site. If the new site has no phrases that are in the phrase model, a prediction cannot be made. In some implementations, a minimum number of phrases must be found in the phrase model before a prediction will be made. In some implementations, the minimum number is a fixed number, e.g., 3, 5, 10, 15, 20, or 50.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. In some implementations, the phrase model can be used to predict the quality of other, smaller collections of text than an entire site, for example, a single page, paragraph, sentence, or even query.

What is claimed is:

1. A method comprising:
    obtaining baseline site quality scores for a plurality of previously scored sites;
    generating a phrase model for a plurality of sites including the plurality of previously scored sites, wherein the phrase model defines, for each of a plurality of phrases, a mapping from each of one or more phrase specific relative frequency measures to a corresponding phrase specific average site quality score, wherein:
        each respective phrase-specific relative frequency measure associated with a phrase represents a measure of how many pages in a site contain the phrase relative to how many pages are on the respective site; and
        the average site quality score for a particular phrase specific relative frequency measure is a measure of a central tendency of the baseline site quality scores of those previously scored sites that have the phrase in the pages of the site with a relative frequency that corresponds to the particular phrase specific relative frequency measure;
    for a new site, the new site not being one of the plurality of previously scored sites, obtaining a respective relative frequency measure for each of a plurality of phrases found on the new site, wherein the new site comprises a plurality of pages, and wherein, for each phrase of the plurality of phrases, the relative frequency measure is a measure of how many of the pages on the new site contain the phrase relative to a count of how many pages are on the new site;
    determining an aggregate site quality score for the new site from the phrase model using the relative frequency measures of the plurality of phrases found on the new site, comprising:
        determining, for each of the plurality of phrases found on the new site, a corresponding phrase-specific average site quality score from the phrase model;
        determining, as the aggregate site quality score for the new site, a measure of central tendency of the phrase-specific average site quality scores corresponding to the plurality of phrases found on the new site; and
    determining a predicted site quality score for the new site from the aggregate site quality score;
    generating respective ranking scores for each of a plurality of resources that satisfy a search query, each of the plurality of resources being in a respective site, including generating the respective ranking scores using the baseline site quality scores of the site for each resource in a previously-scored site and generating the respective ranking scores using the respective predicted site quality score for each resource in a site having a predicted site quality score; and
    using the respective ranking scores to rank the plurality of resources that satisfy the search query.

2. The method of claim 1, wherein:
    each phrase is an n-gram of tokens, the n-gram being a 2-gram, 3-gram, 4-gram or 5-gram.

3. The method of claim 1, wherein the phrase model defines a mapping from each of one or more phrase-specific relative frequency measures to a corresponding vector of phrase-specific average site quality scores.

4. A non-transitory storage medium encoded with instructions that, when executed by one or more computers, cause the one or more computers to perform operations comprising:
- obtaining baseline site quality scores for a plurality of previously scored sites;
- generating a phrase model for a plurality of sites including the plurality of previously scored sites, wherein the phrase model defines, for each of a plurality of phrases, a mapping from each of one or more phrase specific relative frequency measures to a corresponding phrase specific average site quality score, wherein:
  - each respective phrase-specific relative frequency measure associated with a phrase represents a measure of how many pages in a site contain the phrase relative to how many pages are on the respective site; and
  - the average site quality score for a particular phrase specific relative frequency measure is a measure of a central tendency of the baseline site quality scores of those previously-scored sites that have the phrase in the pages of the site with a relative frequency that corresponds to the particular phrase specific relative frequency measure;
- for a new site, the new site not being one of the plurality of previously scored sites, obtaining a respective relative frequency measure for each of a plurality of phrases found on the new site, wherein the new site comprises a plurality of pages, and wherein, for each phrase of the plurality of phrases, the relative frequency measure is a measure of how many of the pages on the new site contain the phrase relative to a count of how many pages are on the new site;
- determining an aggregate site quality score for the new site from the phrase model using the relative frequency measures of the plurality of phrases found on the new site, comprising:
  - determining, for each of the plurality of phrases found on the new site, a corresponding phrase-specific average site quality score from the phrase model;
  - determining, as the aggregate site quality score for the new site, a measure of central tendency of the phrase-specific average site quality scores corresponding to the plurality of phrases found on the new site; and
- determining a predicted site quality score for the new site from the aggregate site quality score;
- generating respective ranking scores for each of a plurality of resources that satisfy a search query, each of the plurality of resources being in a respective site, including generating the respective ranking scores using the baseline site quality scores of the site for each resource in a previously-scored site and generating the respective ranking scores using the respective predicted site quality score for each resource in a site having a predicted site quality score; and
- using the respective ranking scores to rank the plurality of resources that satisfy the search query.

5. The non-transitory storage medium of claim 4, wherein:
- each phrase is an n-gram of tokens, the n-gram being a 2-gram, 3-gram, 4-gram or 5-gram.

6. The non-transitory storage medium of claim 4, wherein the phrase model defines a mapping from each of one or more phrase-specific relative frequency measures to a corresponding vector of phrase-specific average site quality scores.

7. A system comprising one or more computers and one or more storage devices storing instructions that are operable, when executed by the one or more computers, to cause the one or more computers to perform operations comprising:
- obtaining baseline site quality scores for a plurality of previously scored sites;
- generating a phrase model for a plurality of sites including the plurality of previously scored sites, wherein the phrase model defines, for each of a plurality of phrases, a mapping from each of one or more phrase specific relative frequency measures to a corresponding phrase specific average site quality score, wherein:
  - each respective phrase-specific relative frequency measure associated with a phrase represents a measure of how many pages in a site contain the phrase relative to how many pages are on the respective site; and
  - the average site quality score for a particular phrase specific relative frequency measure is a measure of a central tendency of the baseline site quality scores of those previously-scored sites that have the phrase in the pages of the site with a relative frequency that corresponds to the particular phrase specific relative frequency measure;
- for a new site, the new site not being one of the plurality of previously scored sites, obtaining a respective relative frequency measure for each of a plurality of phrases found on the new site, wherein the new site comprises a plurality of pages, and wherein, for each phrase of the plurality of phrases, the relative frequency measure is a measure of how many of the pages on the new site contain the phrase relative to a count of how many pages are on the new site;
- determining an aggregate site quality score for the new site from the phrase model using the relative frequency measures of the plurality of phrases found on the new site, comprising:
  - determining, for each of the plurality of phrases found on the new site, a corresponding phrase-specific average site quality score from the phrase model;
  - determining, as the aggregate site quality score for the new site, a measure of central tendency of the phrase-specific average site quality scores corresponding to the plurality of phrases found on the new site; and
- determining a predicted site quality score for the new site from the aggregate site quality score;
- generating respective ranking scores for each of a plurality of resources that satisfy a search query, each of the plurality of resources being in a respective site, including generating the respective ranking scores using the baseline site quality scores of the site for each resource in a previously-scored site and generating the respective ranking scores using the respective predicted site quality score for each resource in a site having a predicted site quality score; and
- using the respective ranking scores to rank the plurality of resources that satisfy the search query.

8. The system of claim 7, wherein:
- each phrase is an n-gram of tokens, the n-gram being a 2-gram, 3-gram, 4-gram or 5-gram.

9. The system of claim 7, wherein the phrase model defines a mapping from each of one or more phrase-specific relative frequency measures to a corresponding vector of phrase-specific average site quality scores.

* * * * *